(12) United States Patent
Benner, Jr.

(10) Patent No.: US 8,254,045 B1
(45) Date of Patent: Aug. 28, 2012

(54) HIGH-SPEED Z-AXIS FOCUSING DEVICE AND ASSOCIATED METHODS

(76) Inventor: William R. Benner, Jr., Longwood, FL (US)

( * ) Notice: Subject to any disclaimer, the term of this patent is extended or adjusted under 35 U.S.C. 154(b) by 152 days.

(21) Appl. No.: 12/795,278

(22) Filed: Jun. 7, 2010

Related U.S. Application Data

(60) Provisional application No. 61/184,378, filed on Jun. 5, 2009.

(51) Int. Cl.
*G02B 7/02* (2006.01)

(52) U.S. Cl. ........................................ 359/824
(58) Field of Classification Search ............ 359/824
See application file for complete search history.

(56) References Cited

U.S. PATENT DOCUMENTS

| | | | |
|---|---|---|---|
| 6,129,527 A | 10/2000 | Donahoe et al. | |
| 6,141,300 A | 10/2000 | Getreuer et al. | |
| 6,160,768 A | 12/2000 | Yanagawa | |
| 6,885,116 B2 | 4/2005 | Knirck et al. | |
| 7,633,190 B2 | 12/2009 | Liu et al. | |
| 2009/0147384 A1* | 6/2009 | Chang | 359/824 |

OTHER PUBLICATIONS

Nutfield Photonics in Motion, 3XB 3-Axis Scanhead User Manual, Nuffield Technology, Inc., Windham, NH, 91-0027 Rev. 1, Dec. 2003, pp. 1-31.

* cited by examiner

*Primary Examiner* — James Jones
(74) *Attorney, Agent, or Firm* — Allen, Dyer, Doppelt, Milbrath & Gilchrist, P.A.

(57) ABSTRACT

A device for moving an optical element along an axis includes a housing in which is mounted a magnet assembly. The magnet assembly has an axial bore therethrough. An electrically conductive coil assembly has an axial bore therethrough substantially concentric with the magnet assembly's bore. The coil assembly is mounted at least partially within the magnet assembly bore for limited axial movement relative thereto. The coil assembly is placeable in electrical communication with a power source, and can support an optical element within the coil assembly's bore. A sensor is affixed for movement with the coil assembly that is adapted for sensing an axial position of the coil assembly. The sensor is placeable in signal communication with a current source for adjusting current delivered to the coil assembly based upon the sensed axial position.

25 Claims, 13 Drawing Sheets

HIGH-SPEED Z-AXIS FOCUSING DEVICE AND ASSOCIATED METHODS

CROSS-REFERENCE TO RELATED APPLICATION

This application claims priority to provisional patent application Ser. No. 61/184,378, filed Jun. 5, 2009.

BACKGROUND OF THE INVENTION

1. Field of the Invention

This invention relates to apparatus, which can rapidly and precisely position a lens or other optical element along an axis.

2. Description of Related Art

Lasers are used in a variety of fields, from surveying, to supermarket bar-code scanners, to optical disk drives such as CD and DVD drives. One particular class of laser applications involves scanning the laser beam using X-Y galvanometer scanners, for the purpose of marking or cutting material, or for the purpose of creating a visual image.

When lasers are used for marking or cutting, it is typical that the laser beam is deflected by X and Y scanners, and then sent through a "scan lens," which is usually implemented as an F-Theta lens or as a Telecentric lens. The lens is used to focus the laser beam onto the material being marked or cut. Normally the beam diameter exiting from the laser is between 6 and 12 mm, and it is necessary to focus the beam onto the material to achieve a high enough energy density in order to mark or cut the material.

The "scan lens," such as an F-Theta or Telecentric lens, is a significant part of the cost of the overall laser marking system. The lens generally must be two to four inches in diameter, and is often made of exotic materials in order to pass the wavelength of interest. Moreover, the F-Theta and Telecentric lenses create a focus that is onto a planar target. So this means that the material being marked or cut must be flat, so that the beam will remain in focus all along the material's surface. It is not possible to mark onto a non-uniform surface such as a cylindrical soda can or wavy product. This planar and non-changeable focus distance along with the high cost of a scan lens are two disadvantages of using scan lenses. It is therefore desirable to have a system that could provide dynamic focus while the beam is being scanned so that non-uniform surfaces can be marked.

Another application for lasers is for display applications. Laser displays are used for many things, including optical layout templates. In a related application a laser display can be used for entertainment applications, for example, to project company logos, animated cartoon figures and the like, and also projected directly into an audience. When lasers are projected into an audience, referred to as "audience scanning."

When creating a displayed image of a company logo or cartoon, typically the "raw beam" is used out of the laser, then sent to a X-Y scanners. Vector graphics being sent to the X-Y scanners from a computer then creates the image on the target surface. Focusing, defocusing, or changing the beam diameter during the X-Y scanning is not typically done in laser display projectors known in the art. As a result, the image has a roughly constant size laser beam across the entire projection surface. However, it is desirable to have a device that provides variable focus or defocus capability, such that certain parts of the projected image can have a larger spot size (for example, big blushy cheeks on a woman's face) while other parts of the image can have a very small spot size (for example, eye lashes on a woman's face).

Likewise, when creating an audience scanning display, normally the "raw beam" is used right out of the laser, sent to an X-Y scanner, and then directly into the audience. In audience scanning laser projectors known in the art, focusing, defocusing, or changing the beam diameter of the X-Y scanning beam is typically not done. Therefore, just as in the case of a typical laser graphics projector discussed above, the entire audience receives the same diameter laser beam at all times and all places in the projected display. However, it is desirable to have a device that can provide variable focus or defocus such that parts of the image can have a higher beam diameter, and other parts could have a lower beam diameter. With audience scanning applications this can be especially important, because the safety of the laser beam is increased as the diameter of the laser beam is increased within the audience. If a variable focus device were used, it could increase the beam diameter for areas of the laser projection where audience members are particularly close to the laser projector, and thus safety could also be increased.

Several devices are known that try to create a precision, variable-focus system for a laser beam. These devices have generally taken one of two forms. One form is where a normal galvanometer scanner (which is a rotary device) is employed into a system that uses a rotary-to-linear mechanical translator, such as a taut-band Rolamite. The motion of the moving member is then restricted such that it can only move axially, and not radially or rotationally, by a rod-bearing system. A lens or other optical element is then mounted to the moving member. In this way, an off-the-shelf galvanometer scanner can actually be used to move a lens in a linear fashion, instead of moving a mirror in a rotary fashion, as is typically the case for galvanometer scanners. Although galvanometer scanners are off-the-shelf devices, they really were not designed to be applied as lens translators. As a result, there are a number of problems with this technique. The rod bearings eventually wear out, and also have limited maximum speeds. And the linkage between the rotary scanner shaft and linear sliding member cannot be made infinitely stiff; so resonance problems will prevent the speed of such a device from being very high.

Another approach for creating a precision, variable-focus system for a laser beam is to use a moving-coil actuator coupled to a rod-bearing system similar to that described above. The rod-bearing system allows the coil and moving optical element to move axially, but neither radially nor rotationally. Oftentimes, the lens is located in the center of the moving coil. Performance of this type of system is better than the approach described above, but still not satisfactory for some applications, including laser display and audience scanning applications. In one particular prior-art system, wherein the moving element and coil ride along a rod-bearing system, the maximum slew rate achievable is 1600 millimeters per second, and maximum acceleration is 50 Gs.

Certainly the use of a rod-bearing system is a great disadvantage for a Z-axis focusing system for certain applications. As a result, there have been attempts to replace the linear bearing system with flexures of various forms, such as a flat-spring flexure or even wires used as a flexure. However, known flexure systems exhibit self-resonances that prevent the overall Z-axis focusing device from achieving speeds that are anywhere near the frequency of the flexure self-resonances.

In one configuration using metal flexures, an undesirable additional motion is imparted to the moving member. For example, one such approach uses three flat-spring flexures arranged in a triangular fashion. As the moving element is moved along the Z-axis, the flexures maintain axial motion while restricting radial motion. However, due to the triangular and flat-spring nature, as the element is moved, a parasitic rotational motion is also imparted onto the member as it is moved axially. The net result appears as a "screwing" action, which is undesirable when compared with pure linear motion.

In another configuration commonly employed in CD and DVD drives, simple wires are used to restrict the motion of the moving element. However, the diameter of the wires must be quite small in order to allow axial motion, and thus the self-resonant frequency and stiffness in the radial direction are not sufficient for laser display or audience scanning applications.

Whether implemented as a rotary-to-linear device or a moving coil device, there is one thing that currently known systems have in common, and that is that the moving member itself has a lot of mass. For example, within industrial Z-axis focusing devices used for laser marking and cutting, the lowest typical moving mass you can find is at least 20 grams, and a moving mass of 50 grams is much more common. Such a high moving mass is detrimental to achieving very high speeds. Even the in Z-axis focusing devices used in CD and DVD players, the moving mass is typically around 0.3 grams, which is a lot of mass when compared with the force that CD/DVD actuators produce (typically less than 0.2 newtons). Thus the frequency attainable by Z-axis focusing devices at present is insufficient for use within those applications that require very fast dynamic focus action, such as laser displays and audience scanning.

Also, in known devices that use a single magnet concentric with the optical axis, the magnet is positioned inside the coil assembly, with an outer steel "back iron" on the outside of the coil assembly. Since the magnet must have a bore therethrough for passing light, there really is insufficient magnet material to generate substantial flux. As a result, the flux density in the magnetic circuit is sub-optimal; so force is also sub-optimal. Any attempt to increase the outside diameter of the magnet and thus increase flux density would come at the cost of also increasing the coil outside diameter, which increases the moving mass and is thus undesirable.

SUMMARY OF THE INVENTION

The present device advantageously overcomes the problems of known Z-axis focusing devices by providing a moving coil system that uses an optimized magnetic circuit, which provides high efficiency in its ability to create high force, yet with relatively little moving mass. The present device preferably does not use rod bearings, flat-spring flexures, or wires to suspend the moving element, but rather the suspension is made of a corrugated or dome-shaped material, for example, cloth. The resulting device is able to position a lens or other optical element very rapidly and precisely with substantially only axial motion, and substantially without parasitic radial or rotational motion.

A device for altering a focus of a radiation beam along an axis comprises a housing having an inner space extending from a top face through to a bottom face.

A magnet assembly is mounted within the housing and has an axial bore therethrough communicating with the housing's inner space.

An electrically conductive coil assembly has an axial bore therethrough communicating and substantially concentric with the magnet assembly's bore. The coil assembly is mounted within the magnet assembly for limited axial movement within the housing. The coil assembly is placeable in electrical communication with a power source, and further has means for supporting an optical element affixed at least partially within the coil assembly's bore.

A sensor is affixed within the housing's inner space that is adapted for sensing an axial position of the coil assembly. The sensor is placeable in signal communication with means for effecting the delivery of current from the power source to the coil assembly based upon the sensed axial position.

DESCRIPTION OF PREFERRED EMBODIMENTS

Preferred embodiments of the present invention will now be presented with reference to FIGS. 1-13. One of skill in the art will appreciate that relative terms such as "top" and "bottom" are not intended to limit the scope of the invention, and are used for ease of reference to the drawings.

Figure 1:
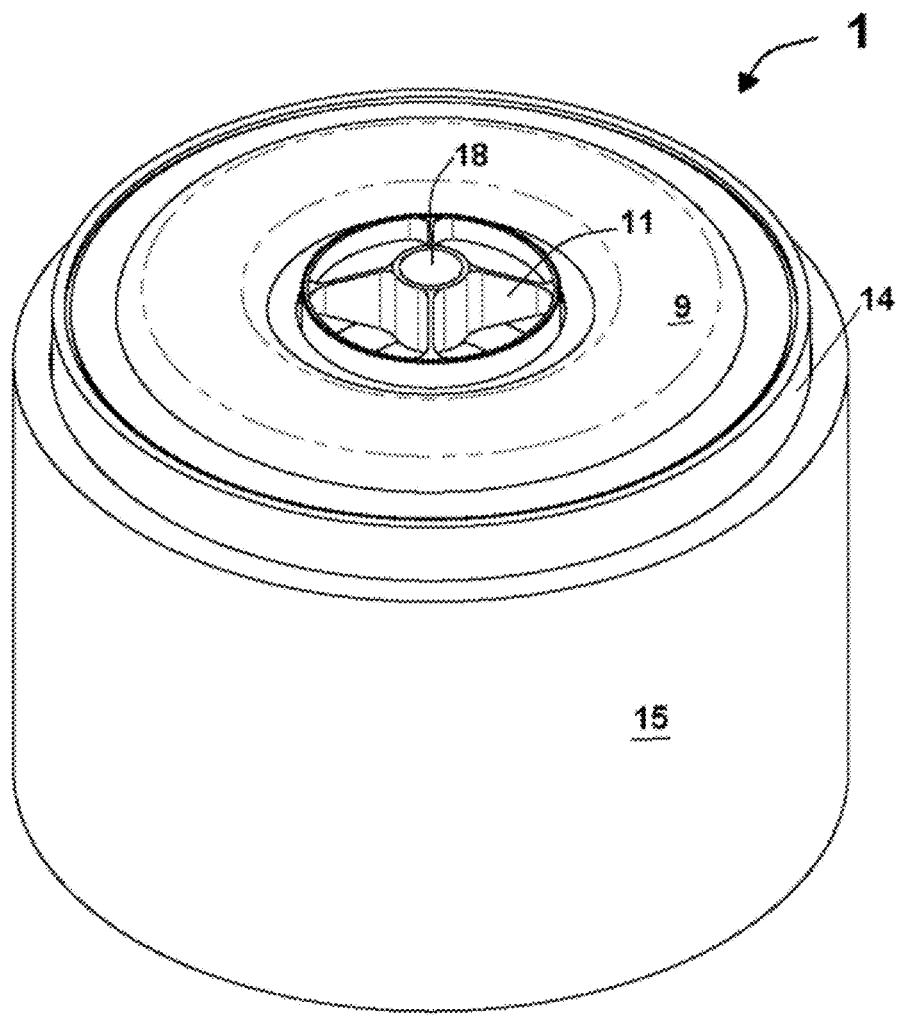
FIG. 1 shows a perspective view of one embodiment of the present invention.
Figure 2:
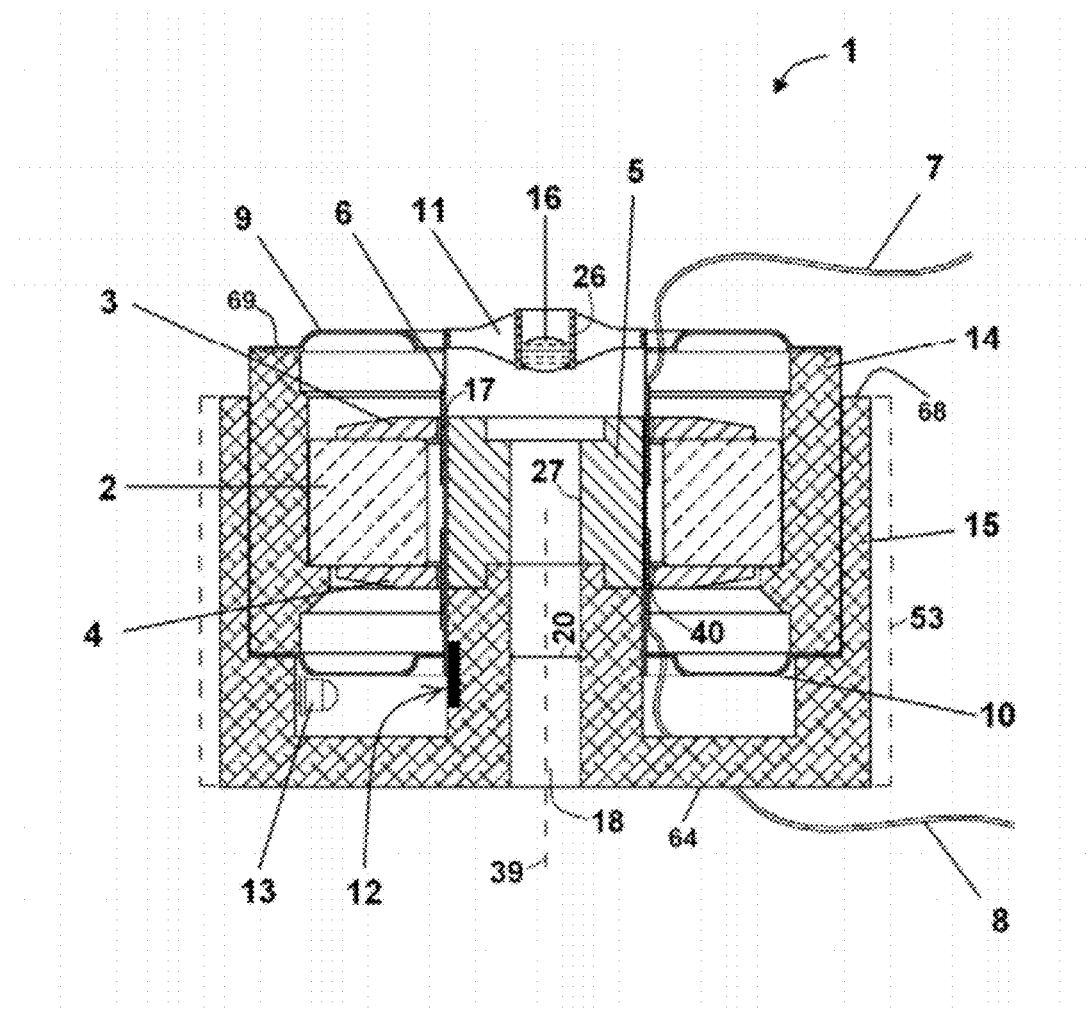
FIG. 2 shows a cutaway view of one embodiment of the present invention.
Figure 3:
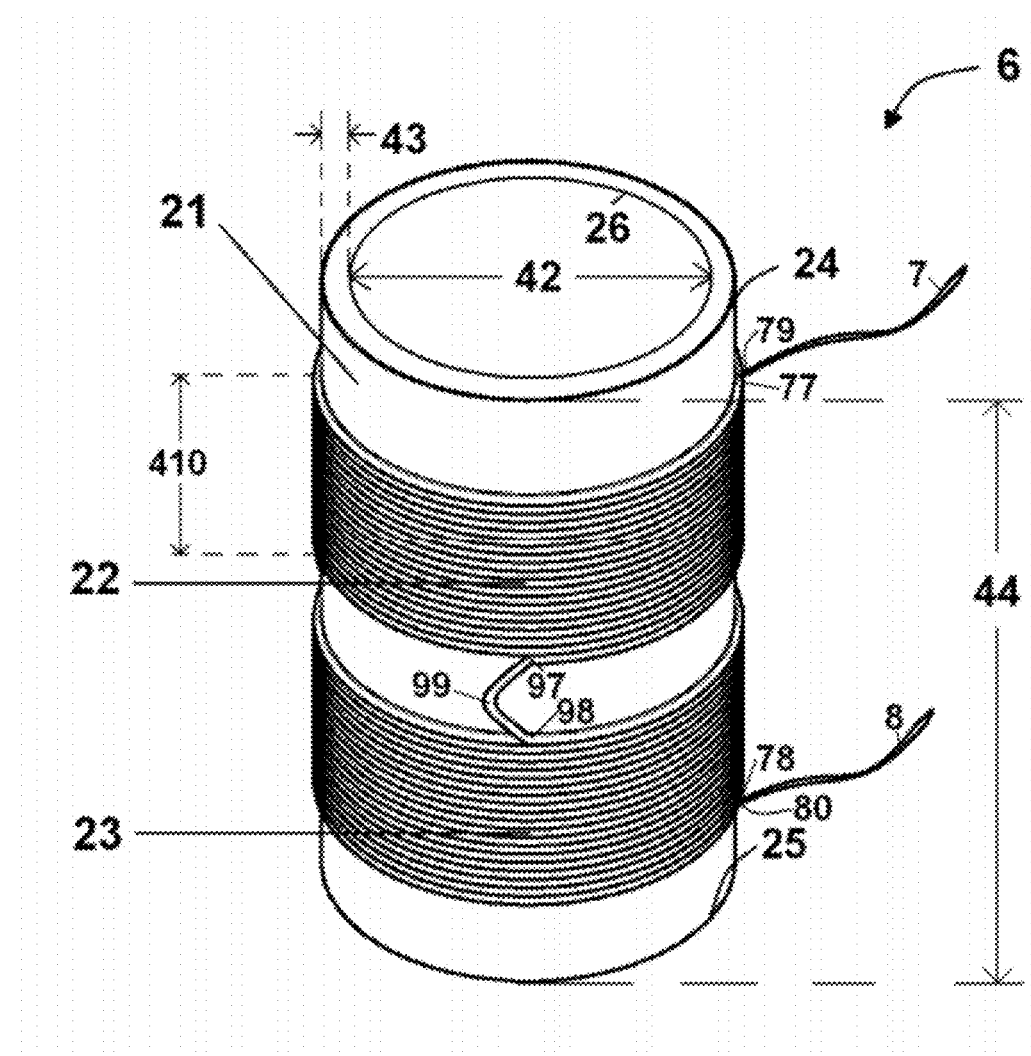
FIG. 3 shows one possible embodiment of a coil assembly used in the present invention.
Figure 11:
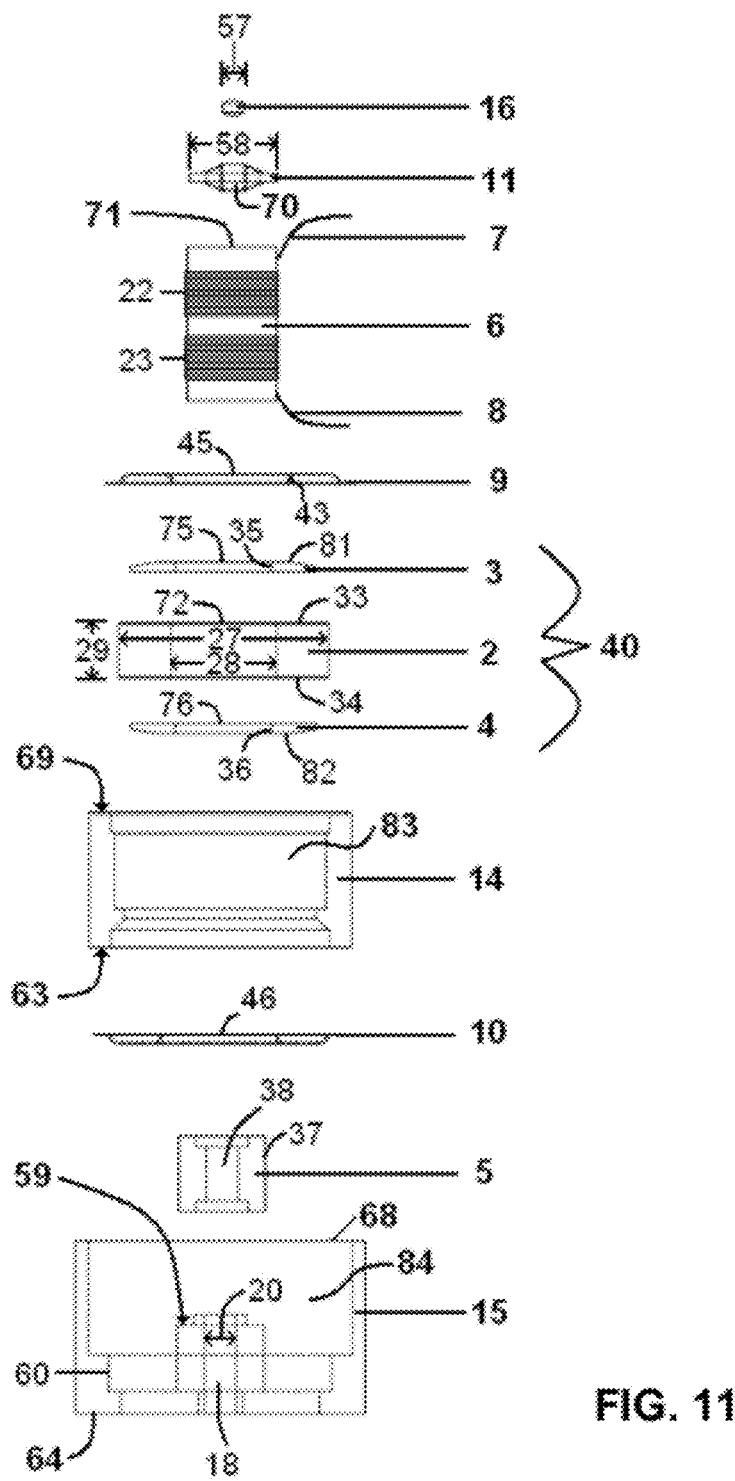
FIG. 11 shows an exploded view of one embodiment of the present invention.

A preferred embodiment of a focusing device as assembled is illustrated in FIGS. 1 and 2, with an exploded view in FIG. 11. The Z-axis focusing device 1 comprises an inner housing 14 supporting at least partially within an inner space 83 a magnet assembly 40, comprising a magnet 2 and a top 3 and a bottom 4 gap plate, a moving coil assembly 6, ends 79,80 of a top 7 and bottom 8 flexible conductive member, a top 9 and bottom 10 suspension member, and an optical element holder 11.

In this embodiment, the device 1 further comprises an outer housing 15 supporting at least partially within an inner space 84 a central pole piece 5 that can comprise steel, a position sensor 12, and the inner housing 14. One of skill in the art will appreciate that the "housing" can also comprise a unitary element without departing from the spirit of the invention.

Figure 4:
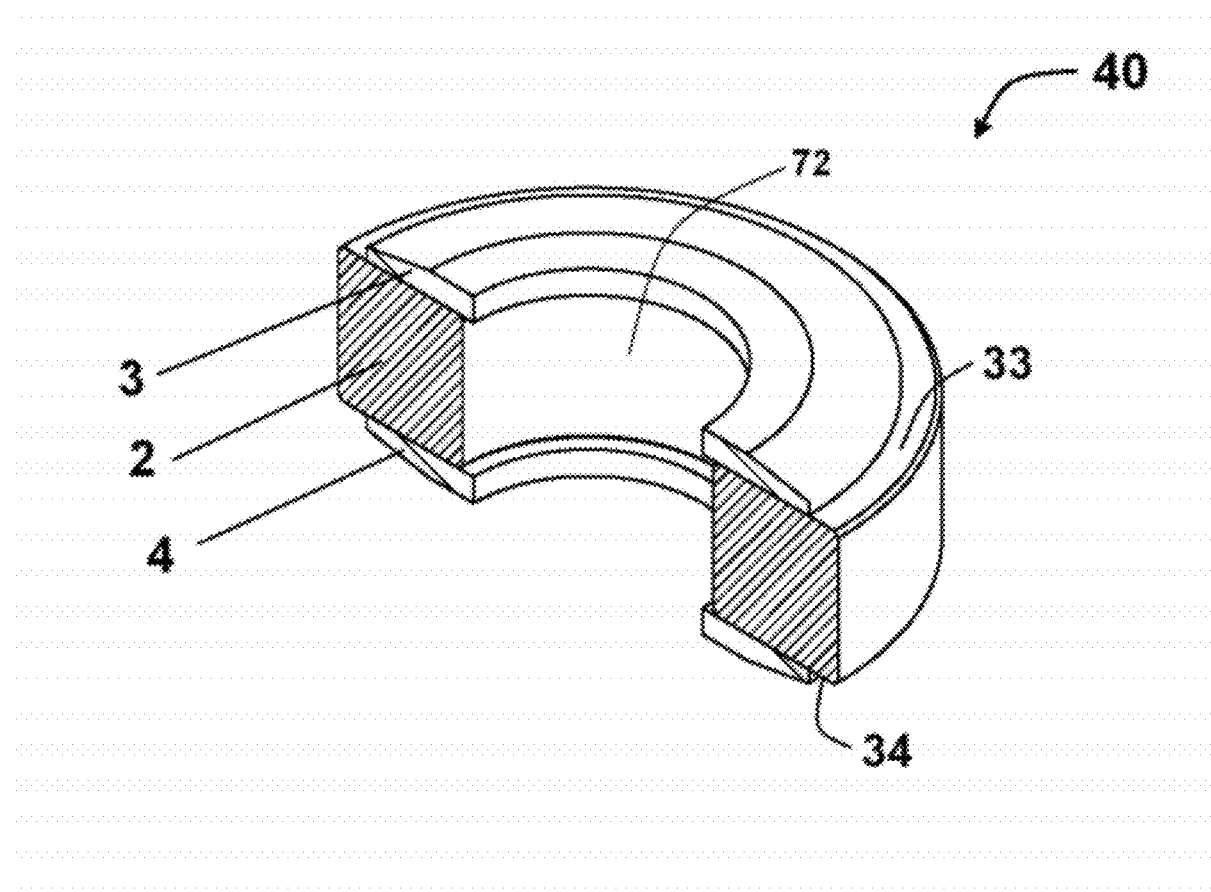
FIG. 4 shows one possible embodiment of a magnet assembly, top gap plate, and bottom gap plate used in the present invention.
Figure 5:
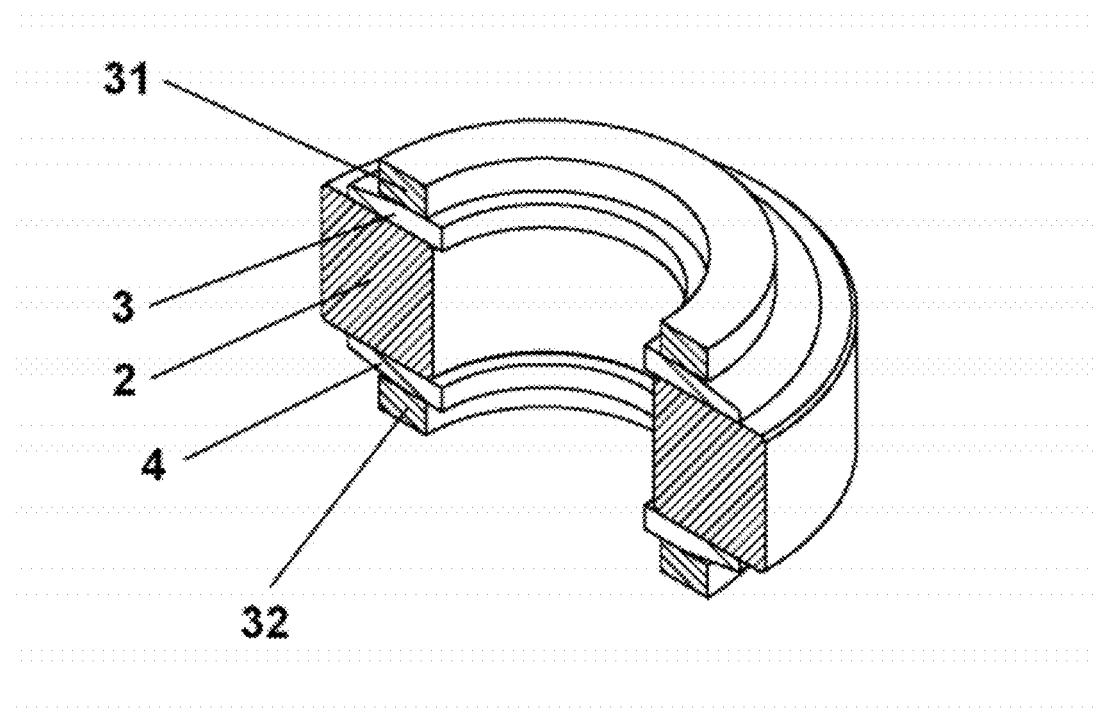
FIG. 5 shows another possible embodiment of a magnet assembly, top gap plate, bottom gap plate, and additional shielding magnets used in the present invention.

In an embodiment 21, the magnet can comprise a unitary ring magnet 2 having an axial bore 72 therethrough (FIG. 4). The magnet assembly 40 further can comprise substantially identical annular top 3 and bottom 4 gap plates having respective axial bores 75,76 therethrough. The top 3 and the bottom 4 gap plates are positioned in sandwiching relation, respectively, adjacent a top 33 and a bottom 34 surface of the magnet 2, with the respective axial bores 72,75,76 in communication.

In a particular embodiment, the ring magnet 2 has an outer diameter 27 of 60 mm, a bore diameter 28 of 30 mm, and a thickness 29 of 16 mm. The magnet 2 can comprise a material such as N42H-grade neodymium iron boron. Although these dimensions and material are used in a particular embodiment, they should not be considered limitations on this invention, and one of skill in the art will appreciate that any suitable magnet dimensions and material can be used. Moreover, it is possible that the magnet 2 may be segmented into multiple pieces if desired, thereby comprising multiple magnets, all connected to the top 3 and bottom 4 gap plate. Note that, although a unitary ring magnet 2 is believed to be the simplest and least expensive configuration at the time of filing, the magnet 2 could have a non-round shape, for example, square or polygonal.

The magnet material is magnetized axially, in such a way that magnetic flux lines 112 (FIG. 13) leave the top 33 and bottom 34 surfaces of the magnet 2 and are conducted by the top 3 and the bottom 4 gap plate. These flux lines 112 jump across an annular gap 17 (FIGS. 2 and 13) between inner surfaces 35,36 of the top 3 and the bottom 4 gap plates and an outer surface 37 of the central pole piece 5 (FIG. 11). In one possible embodiment, the top 3 and bottom 4 gap plate and central pole piece 5 all comprise Q235 steel, although this material should not be deemed a limitation on this invention, and any suitable soft magnetic material can be used.

In many known designs, a "back iron" is used to complete the magnetic circuit. However, within the present exemplary device 1, the central pole piece 5 completes the magnetic circuit. One of skill in the art will also appreciate that other embodiments may be contemplated that do not include a central pole piece. In this embodiment 1 and because of the ability to increase the magnet's outer diameter 27 without changing the dimensions of the coil assembly 6, the magnet assembly 2 is able to drive a high flux density across two separate magnetic gaps 17. An air-gap flux density achievable by an embodiment is nearly 1.9 Tesla, which is much greater than the air-gap flux density of magnetic circuits known in the art. In an alternate embodiment that does not employ a central pole piece, the flux density will be lower, which may be acceptable in certain situations.

The outer housing 15 comprises an upwardly extending, substantially annular, support post 59 positioned therewithin in spaced relation from a bottom surface 64 of the outer housing 15, for supporting the central pole piece 5 thereatop and in spaced relation from a top surface 68 thereof (FIG. 2). The central pole piece 5 has an axial hole 38 extending therethrough, and the outer housing 15 has an axial hole 18 extending from the bottom face 64 into the inner space 84, the axial holes 18,38 substantially concentric, so that light can travel directly through a center 39 of the device 1 and reach an optical element 16.

In an alternate embodiment, wherein it is not a requirement that light travel through the device, there would be no need for a bore through the device's center. For example, if the optical element were to comprise a mirror, the light could enter from the device's top end and be reflected off the mirror rather than traveling through the device. In such a system, the moving coil arrangement can be used to move the mirror in and out of the light path. Thus the present invention is not intended to be limited to devices having bores therethrough.

In a particular embodiment having a bore through the device, a hole 18 diameter 20 is approximately 9 millimeters, although experiments have shown that a hole diameter 20 up to 20 millimeters can be used without changing any other components, while still maintaining acceptable performance. If it is desirable to have a central pole piece hole diameter 20 greater than around 20 millimeters, then the central pole piece can be omitted, or the housings 14,15, magnet assembly 2, top 3 and bottom 4 gap plates, and central pole piece 5 can all be made larger.

A substantially cylindrical coil assembly 6 resides within annular gaps 17 formed between the central pole piece 5 and the top 3 and bottom 4 gap plates, respectively, and having an axial bore 71 therethrough substantially concentric with the magnet assembly bore 72. Since there are two separate magnetic gaps 17 across which magnetic flux flows, an embodiment of the focusing device 1 can comprise two separate coils of wire 22,23 wound circumferentially around a common bobbin 21. To minimize the moving mass, the bobbin 21 material can comprise a material such as Kapton® or aluminum, and the wire material can also comprise aluminum, although any suitable bobbin and wire material may be used to satisfy engineering constraints.

In an embodiment in which the coil assembly 6 comprises a common bobbin 21 around which two separate, top and bottom, coils 22,23 are formed, each of the two coils 22,23 can comprise 25 turns of AWG #25 wire, yielding a wind height 410 of approximately 12.5 mm for each of the coils 22,23. First ends 77,78 of the two coils 22,23 can be connected at opposed (here, top and bottom) first ends 79,80 of flexible conductive members 7,8, with second ends 97,98 connected adjacent a middle 99 therebetween, so that the electrical current flows in opposite directions through each coil 22,23, wherein the polarities of the magnetic flux are opposite for the top 3 and the bottom 4 gap plates. Note, however, that other embodiments are possible, such as those using multiple layers of wire, connected to flexible conductive members that are placed adjacent the top 24 of coil assembly 6. Force is produced as long as the current in the top coil 22 flows in the opposite direction to that in the bottom coil 23.

The coil assembly 6 can be electrically connected to an output of a servo amplifier (not shown) through the top 7 and the bottom 8 flexible conductive members to provide electrical current, which in turn creates force. The top 7 and the bottom 8 flexible conductive members can comprise solid bands comprising beryllium-copper, phosphor bronze, or a similar conductive but flexible material with high fatigue strength. In an alternate embodiment, stranded conductors are used, wherein the strands are wound around a fiber such as Nomex® to increase fatigue strength. Although the conductive members are illustrated as being located at the top 24 and bottom 25 ends of the coil assembly 6, it is also possible to position both conductive members at the top 24 or bottom 25 ends of the coil assembly 6. Any known method of delivering current to the coil assembly 6 is intended to be subsumed within the scope of the invention.

In the present device 21, the coil assembly 6 has, approximately, a 25.4-millimeter inside diameter 42, a 0.075-millimeter thickness 43, and a 44-millimeter height 44, although any suitable coil diameter, thickness, and height can be used as long as the inner housing 14, outer housing 15, magnet assembly 2, top 3 and bottom 4 gap plates, and central pole piece 5 are scaled accordingly.

The coil assembly 6 has relatively low mass, but, when coupled with the magnetic circuit, yields a very high force. Within this embodiment, a typical force comprises 3.2 newtons per ampere, and the entire moving mass is less than 4 grams, including the moving optical element 16.

With the use of aluminum wire that is held in close proximity to the central pole piece 5, the thermal performance of this invention is also very good. This embodiment 1 can withstand 50 watts RMS electrical power, which corresponds to around a 26-newton RMS force output. Since the total moving mass is less than 4 grams, the linear acceleration can be over 6500 meters per second squared RMS.

Although this device 1 uses two separate coils 22,23 wound around a single bobbin 221, it is also possible to use a unitary coil of wire, for example, adjacent a top 24 of the coil assembly 6, and leave a bottom 25 of the coil assembly 6 unoccupied. Such an embodiment still includes two magnetic gaps 17, but only one coil of wire 22, thereby using only one of the magnetic gaps 17 to create force. Here only half of the force is produced as compared with a coil assembly 6 having two coils of wire 22,23. In some cases this would be less desirable, because generally it is desired to maximize the force output from such a system. However, it could be desirable in certain circumstances, and therefore it remains within the scope of this invention to use a coil assembly having a unitary coil rather than two coils.

Likewise, in another embodiment, it is also possible to stack a second magnet atop a first magnet, and provide a third gap plate and third coil on a common bobbin.

FIG. 4 is a section view of the magnet assembly 40, including the magnet 2 and top 3 and bottom 4 gap plates in the present embodiment 1. As noted above, this embodiment 1 uses a unitary ring magnet 2 as an element of the magnet assembly 40. In an alternate embodiment (FIG. 5) top 31 and bottom 32 additional magnets are positioned adjacent, respectively, a top face 81 of the top gap plate 3 and a bottom face 82 of the bottom gap plate. Thus the additional magnets 321,32 are arranged so as to provide a magnetic shielding effect. These magnets 321,32 can be used with additional gap plates and coils. Thus the additional magnets 321,32 can be used for either or both of magnetic shielding and force production. When used only for the purposes of magnetic shielding, the magnetic polarity of the additional magnets 321,32 are preferably oriented in opposite axial directions to the magnetic polarity of magnet 2.

If additional magnetic shielding is desired, a thin, substantially cylindrical sleeve 53 can be positioned around at least a portion, and preferably all, of the outer housing 15 (shown in dashed lines in FIG. 2). Such a sleeve 53 can comprise a material such as Q235 steel or any other soft magnetic material.

A suspension system is also provided for keeping the coil assembly 6 substantially centered within the annular air gaps 17 formed by the top 3 and bottom 4 gap plates, and the central pole piece 5, while allowing axial compliance to permit limited axial movement to the optical element 16. The suspension system comprises top suspension member 9 and bottom suspension member 10, connecting, respectively, a top 69 and bottom 63 surface of the inner housing 14 to the top 24 and bottom 25 ends of the coil assembly 6. The suspension system allows the coil assembly 6 to move axially, but substantially not in a radial or rotational direction.

Figure 6:
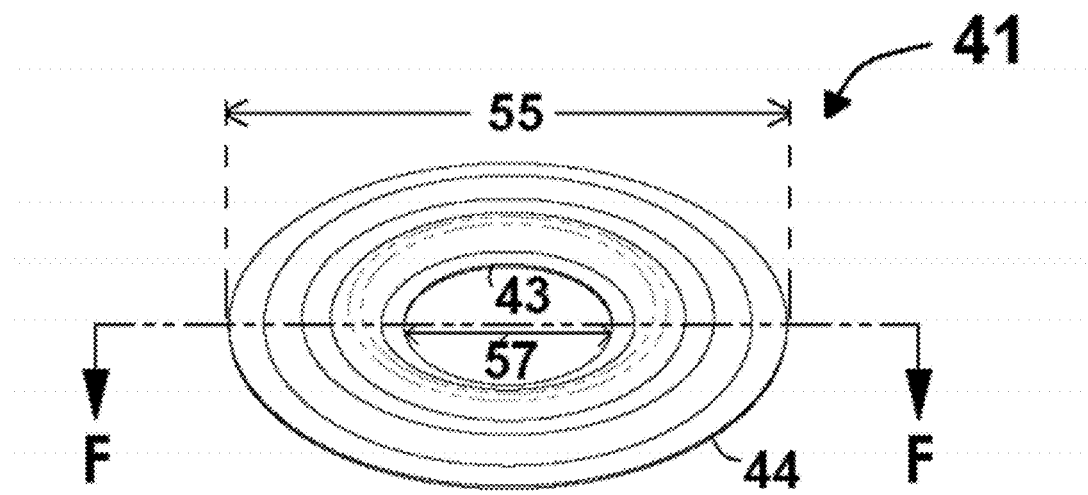
FIG. 6 shows a perspective view of a corrugated disk, which is one possible type of suspension member in the present invention.
Figure 7:
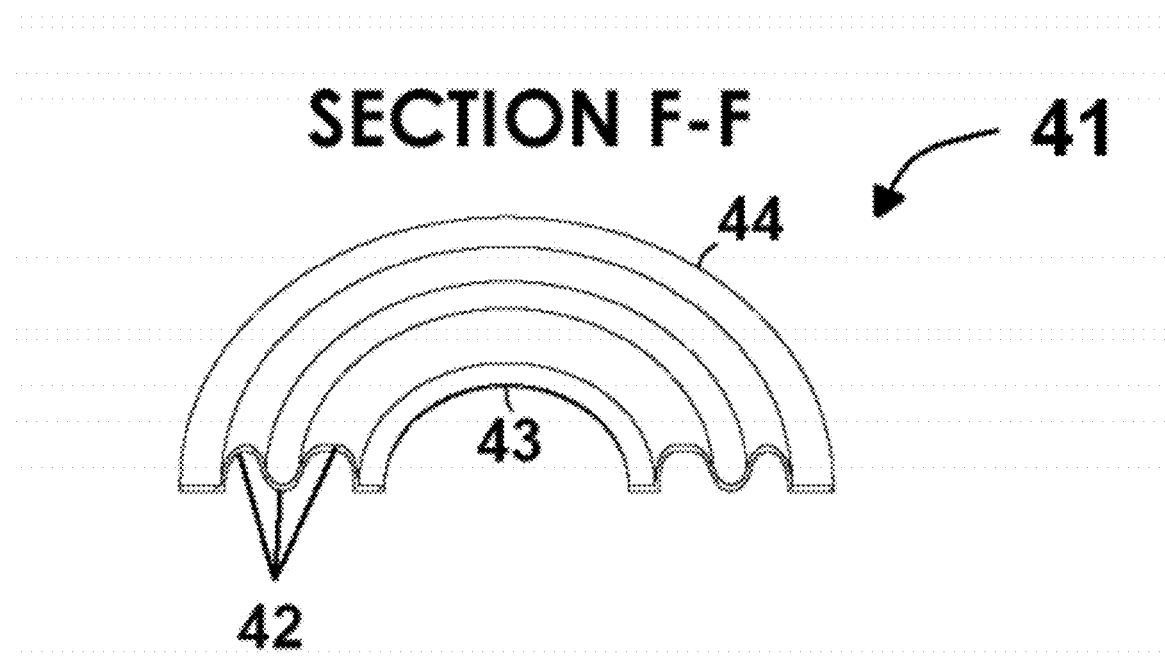
FIG. 7 shows a cutaway view of the corrugated suspension member shown in FIG. 6.

FIG. 6 illustrates an exemplary corrugated annular suspension disk 41 having an inner 43 and an outer 44 edge. FIG. 7 is a sectional view of the corrugated suspension disk 421, illustrating exemplary individual, annular corrugations 42. The suspension disk 41 can comprise, for example, Nomex® cloth. Nomex® is a synthetic material made by Dow Chemical Corporation, and has a degree of flexibility and also very good fatigue strength, allowing it to be bent and relaxed many repeatedly without breaking or substantial degradation.

The Nomex® cloth can be formed into corrugated disks 41 using a resin and hot press technique, for example; however, any suitable material and forming technique can be used as long as the resultant disk provides good radial stiffness but axial compliance. Exemplary materials can include cloth made from cotton, polyester/cotton blend, Nomex®/cotton blend, or Nomex®/polyester blend that could be used with the same resin and hot press technique. Alternatively, acrylic cloth could be used and formed by heating the cloth and then constraining it in a cold mold. A rubber or polymer such as Neoprene or TEEE (an ether/ester-based thermoplastic elastomer), with or without cloth impregnated into the material, can also be used as a suspension material.

Figure 8:
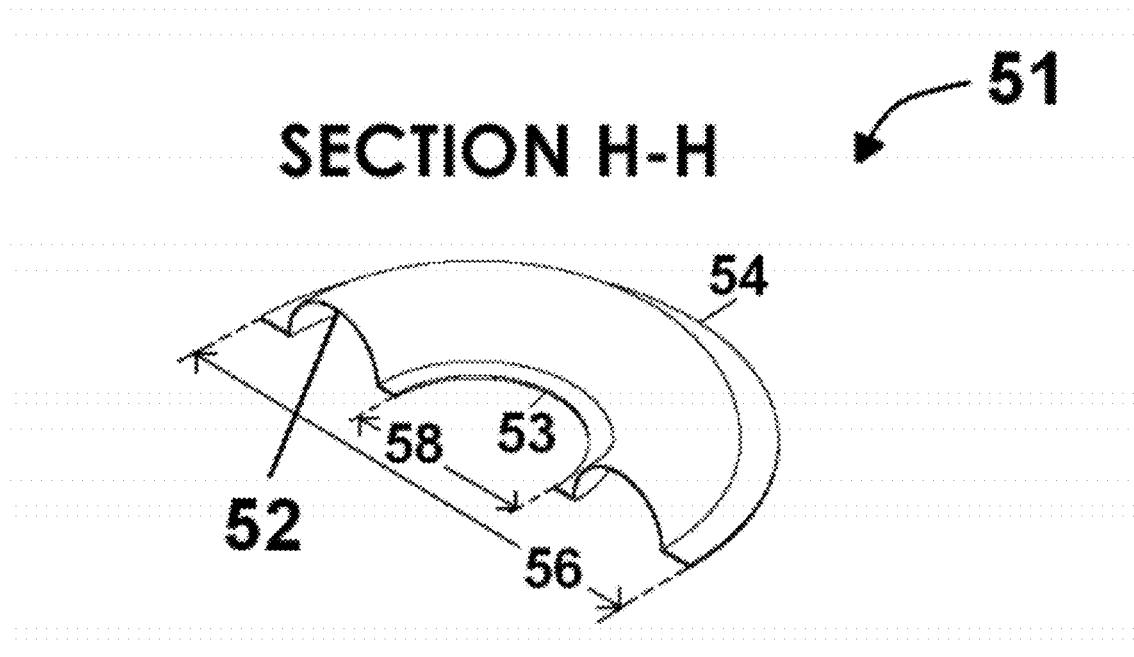
FIG. 8 shows a cutaway view of a dome-type suspension member that may be used in the present invention.
Figure 9:
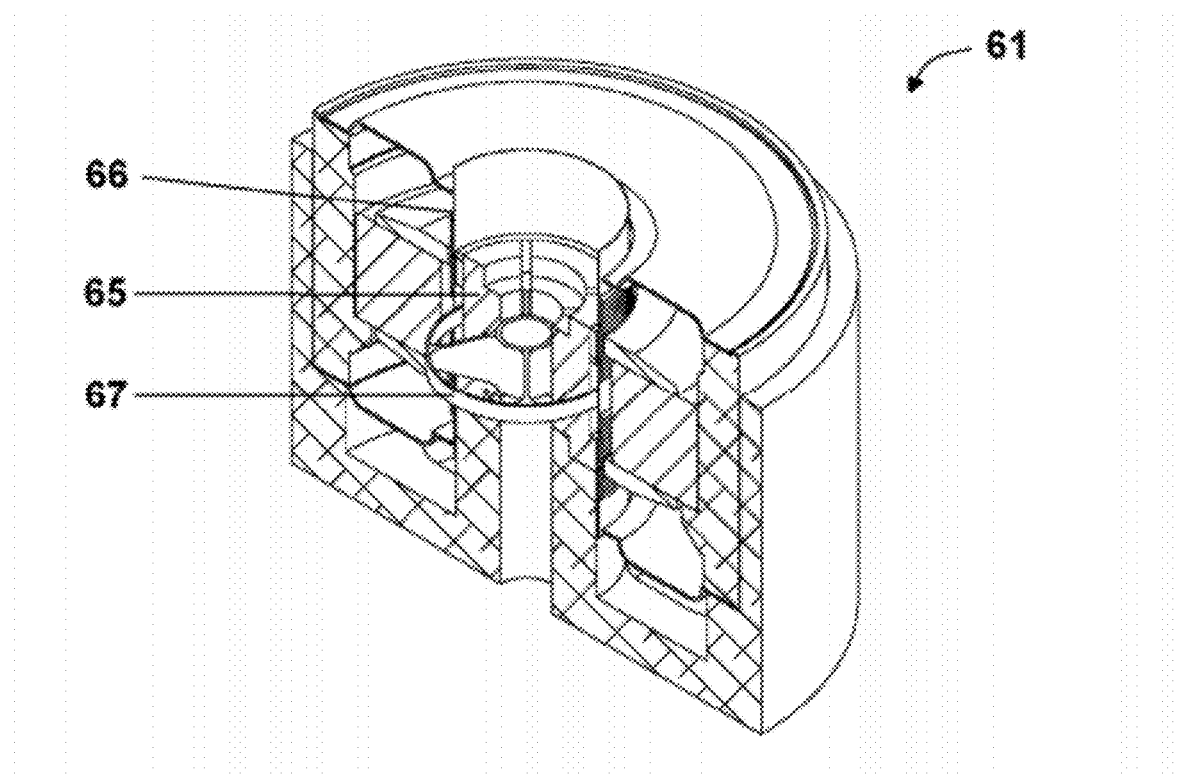
FIG. 9 shows a cutaway view of another possible embodiment of the present invention.
Figure 10:
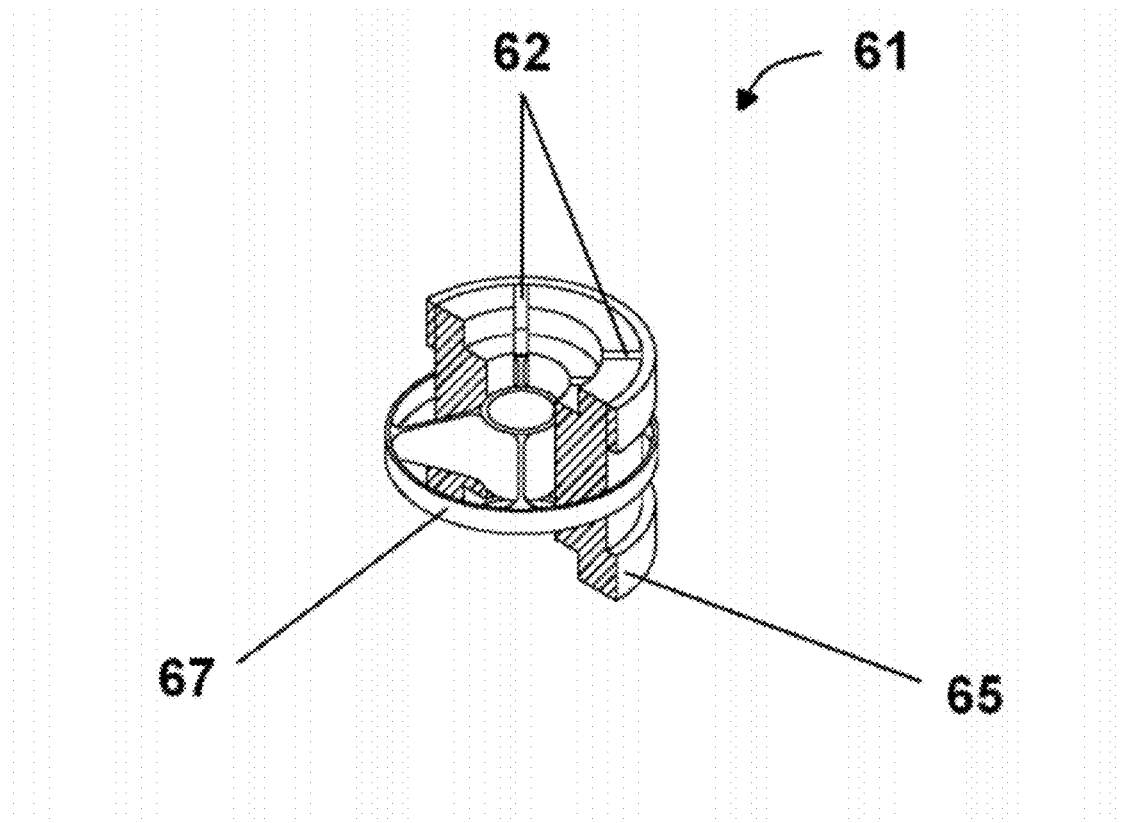
FIG. 10 shows another possible method of making a central pole piece with slits and locating the optics mount within it.

As mentioned, although the formation of cloth into corrugated concentric rings works well, it is also possible that the material may be formed into a dome shape or truncated dome shape that is generally hemispherical and achieve similar results. FIG. 8 is a sectional view of a dome-shaped suspension member 51 having an inner 53 and an outer 54 edge and a generally hemispherical domed central portion 52, the domed portion 52 extending away from the respective top 69 and bottom 63 surface of the inner housing 14.

In a particular embodiment, the respective outside diameters 55,56 of the suspension members 421,51 can be approximately 70 millimeters, and the respective inside diameters 57,58 can be approximately 26 millimeters. Inner edges 43,53 of the suspension members 421,51 can be attached adjacent opposed top 24 and bottom 25 ends of the coil assembly 6, for example, using cyano-acrylate adhesive. Outer edges 44,54 of the suspension members 421,51 can be attached to the inner housing 14, for example, using a two-part epoxy. The adhesives mentioned herein are exemplary, and any suitable adhesives can be used as long as they provide sufficiently high strength and durability.

Within a particular embodiment, the coil assembly 6 is allowed to move approximately 5 millimeters axially in either direction relative to its central resting position, and therefore a 10-mm total compliance is achieved. If a greater compliance is desired, it is generally necessary to increase the outside diameters 55,56 of the suspension members 421,521, and if a smaller compliance is desired, then the outside diameters 55,56 of the suspension members 421,51 can be smaller.

A lens or other optical element 16 can be attached to an inner surface 26 of the coil assembly's bore 71 (FIGS. 2 and 3), above the central pole piece 5, permitting the optical element 16 to move axially along with the coil assembly 6. This positioning of the optical element 16 is not intended as a limitation on the invention, and one of skill in the art will appreciate that other means of supporting the optical element 16 for movement with the coil assembly 6 is intended to be subsumed within the scope of the invention.

In a particular embodiment, the optical element 16 can be used to alter a focus of a beam of radiation passing through the device 1 and impinging upon the optical element 16. For example, the optical element 16 can be used to focus or de-focus the radiation beam as desired, although this is not intended as a limitation.

In another embodiment, wherein the optical element does not require the radiation beam to pass therethrough, for example, wherein the optical element comprises a reflective element, and the radiation beam can enter from "above" and be reflected back "upward."

Figure 12:
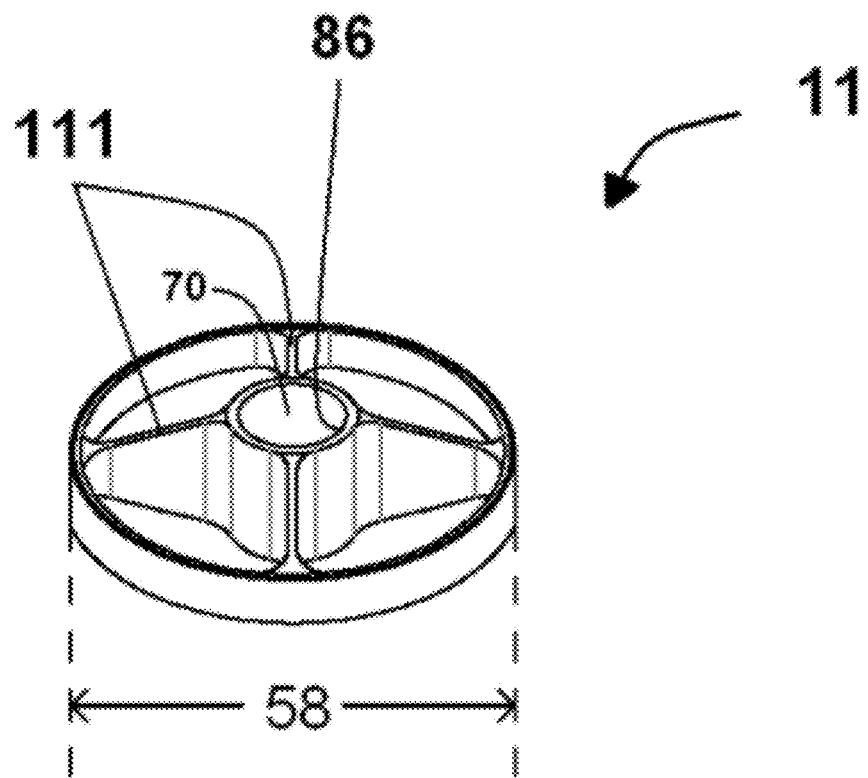
FIG. 12 shows one possible embodiment of an optical element holder of the present invention.
Figure 13:
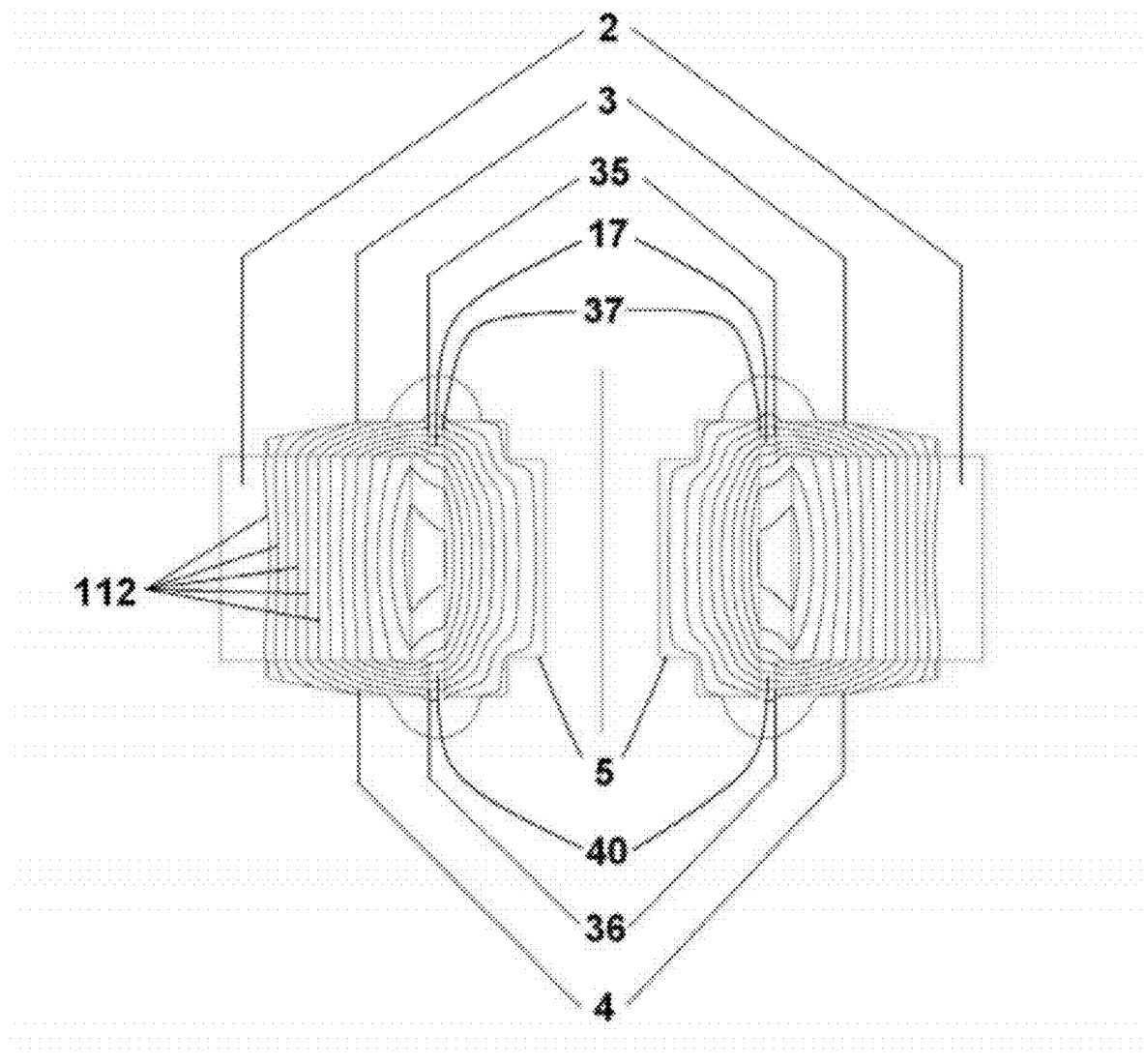
FIG. 13 shows a sectional view of the magnet assembly, top gap plate, bottom gap plate and central pole piece, and the resulting pathway taken of the flux lines in one embodiment of the present invention.

Preferably the optical element 16 is affixed very stiffly to the coil assembly 6, in order to provide good dynamic performance. The optical element 16, which can comprise a lens, can have a diameter 57 up to the inside diameter 42 of the coil assembly bore 71; however, if the optical element 16 has a smaller diameter 57 than that 42 of the coil assembly bore 721, then a suitable optical element holder 11 is needed that has a diameter 58 adapted for positioning the optical element 16 substantially centrally within the coil assembly bore 71. The optical element holder 11 has a bore 70 therethrough communicating with the outer housing hole 18 and the central pole piece hole 38 (FIG. 12). The optical element holder 11 may also include one or more, here, a plurality of, radial struts 1121, which allow for a very lightweight construction and also allow air to pass freely around the struts. This construction reduces turbulence that might otherwise influence the radial position of the optical element 16 during high-speed movement.

In another embodiment 61 (FIGS. 9 and 10), the central pole piece 65 contains longitudinal slits 62 for allowing the optical element holder 67 to reside substantially in the center of the coil assembly 66. Such a central positioning is preferably precise, in order to allow the coil assembly 66 to remain perfectly balanced. When high forces and high speeds are experienced, such balance aids in preventing resonances and other undesirable phenomenon. However, the suspension mechanism of the device 1 has sufficient radial stiffness to enable placing the optical element 16 in a position other than the center of the coil 66, for example, having some radial offset, while still achieving a high degree of performance.

The device 1 further comprises a position sensor comprising an element capable of sensing position, generating a signal, and sending that signal to a servo amplifier. Within one exemplary embodiment, the position sensor comprises a photodiode 12 having an approximate length of 10 mm and an approximate width of 1 mm. The photodiode 12 is mounted within the outer housing 15, beneath the magnet assembly 2, adjacent the post support 59 that holds the central pole piece 5 in place. The photodiode 12 is preferably arranged such that approximately half of it extends downwardly from the bottom 25 of the coil assembly 6 when the coil assembly 6 is in its resting position. In this way, movement of the coil assembly 6 upward by 5 mm uncovers substantially the entire 10-mm length of the photodiode 12, and movement of the coil assembly 6 downward by 5 mm covers substantially the entire length of the photodiode 12.

The position sensor further comprises a light source, for example, an LED 13, affixed within the outer housing 15 on an inner wall 60 opposed to the post support 59, facing toward the photodiode 12 and bottom end 25 of the coil assembly 6. The LED 13 generates a substantially constant amount of light. In this way, movement of the coil assembly 6 up and down uncovers and covers the photodiode 12, thereby generating a photocurrent that can be sensed by the servo amplifier. (The connections of the LED 13 and photodiode 12 to the servo amplifier are not shown in the figures.)

One of skill in the art will appreciate that the position sensor could also be positioned adjacent the coil assembly's top end 24 without departing from the spirit of the invention. Similarly, other optical position-detection elements are also possible, such as the bobbin's having a small hole therein, and the LED 13 generating light that travels through the hole to a position-sensing device used in place of photodiode 12. Position-sensing systems that do not rely on light, but rather on capacitance or inductance, for example, may also be used and still remain within the scope of the invention.

In an embodiment 21, the housing comprises the outer housing 15 and the inner housing 14. The outer housing 15 holds the central pole piece 5 in place. The inner housing 14 holds the magnet assembly 40 and the top 9 and the bottom 10 suspension members. The top 3 and bottom 4 gap plates can be mounted directly to the magnet 2 itself. This arrangement provides easy assembly and good concentricity between the various parts. The outer housing 15 and inner housing 14 can comprise aluminum, because it is a non-magnetic material having good thermal conductivity, although any suitable material and construction technique may be used.

When used with a suitable servo amplifier, such as one that uses a PID technique, high performance can be obtained from this device 1. Small signal step times less than 300 microseconds and small signal bandwidths greater than 2.5 kHz, are possible. Large signal step times of approximately 1.2 milliseconds are also typical with a peak drive current of 13 amps and a servo output stage power supply voltage of ±24 volts.

An exemplary method of assembling a device 1 can be accomplished as follows: The top 3 and bottom 4 gap plates are attached to magnet 2 using a suitable bonding agent such as epoxy so as to be as concentric as possible. This combination forms magnet and gap plate assembly 40 (FIG. 4). The magnet and gap plate assembly 40 is then slid into inner housing 14 and bonded in place using a suitable bonding agent such as epoxy.

The top suspension member 9 is then attached to the top surface 69 of the inner housing 14 using a suitable bonding agent such as epoxy. Likewise, the bottom suspension member 10 is attached to the bottom surface 63 of the inner housing 14 using a suitable bonding agent such as epoxy. The top 9 and bottom 10 suspension members should preferably be made as concentric as possible with the inner housing 14.

The coil assembly 6 is inserted into the center 45 of the top suspension member 9 and also through the center 46 of the bottom suspension member 10. The upper portion 27 of the coil assembly 6 is then bonded to the inner edge 43 of the top suspension member 9, and the lower portion 28 of the coil assembly 6 is bonded to the inner edge 43 of the bottom suspension member 10 using a suitable bonding agent such as cyano-acrylate adhesive.

The central pole piece 5 is bonded to the post support 59 of the outer housing 15 using a suitable bonding agent such as epoxy. The central pole piece's hole 38 should preferably be made as concentric as possible with the outer housing's hole 18.

The top 7 and bottom 8 flexible conductive members are then attached to the coils of wire 22,23 using solder or another electrically conductive adhesive to form a series electrical circuit.

The position sensor 12 is then bonded to the post support 59 of the outer housing 15, and the LED 13 to the outer housing's inner wall 60, facing the position sensor 12. The inner housing 14 is then slid into the outer housing 15. The optical element 16 is bonded to an inner surface 86 of the optical element holder 11. The optical element holder 11 is then bonded to the inside edge 27 of the coil assembly 6 above the central pole piece 5.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A device for moving an optical element along an axis comprising:
   a housing having an inner space extending from a top face through to a bottom face;
   a magnet assembly mounted within the housing and having an axial bore therethrough communicating with the housing inner space;
   an electrically conductive coil assembly having an axial bore therethrough communicating and substantially concentric with the magnet assembly bore, the coil assembly mounted at least partially within the magnet assembly bore for limited axial movement within the housing, the coil assembly placeable in electrical communication with a power source, the coil assembly further having means for supporting an optical element for movement with the coil assembly;
   a sensor supported and adapted for sensing an axial position of the coil assembly and placeable in signal communication with means for effecting the delivery of current from the power source to the coil assembly based upon the sensed axial position; and
   a suspension system bridging the coil assembly and the housing, effective to maintain the coil assembly substantially centered within the magnet assembly bore, permitting the coil assembly to move axially but substantially preventing radial and rotational movement, the coil assembly biased by the suspension system to a substantially central resting position axially.

2. The device recited in claim 1, wherein the magnet assembly comprises:
   an axially magnetized, substantially toroidal magnet having an axial bore therethrough;
   a substantially annular top gap plate having an axial bore therethrough and positioned adjacent a top surface of the toroidal magnet; and
   a substantially annular bottom gap plate having an axial bore therethrough and positioned adjacent a bottom surface of the toroidal magnet;
   wherein the axial bores of the magnet and the top and the bottom gap plate are in axial communication.

3. The device recited in claim 2, further comprising a top and a bottom annular magnet positioned, respectively, adjacent a top surface of the top gap plate and a bottom surface of the bottom gap plate.

4. A device for moving an optical element along an axis comprising:
   a housing having an inner space extending from a top face through to a bottom face;
   a magnet assembly mounted within the housing and having an axial bore therethrough communicating with the housing inner space;
   an electrically conductive coil assembly having an axial bore therethrough communicating and substantially concentric with the magnet assembly bore, the coil assembly mounted at least partially within the magnet assembly bore for limited axial movement within the housing, the coil assembly placeable in electrical communication with a power source, the coil assembly further having means for supporting an optical element for movement with the coil assembly;
   a sensor supported and adapted for sensing an axial position of the coil assembly and placeable in signal communication with means for effecting the delivery of current from the power source to the coil assembly based upon the sensed axial position; and
   a magnetic central pole piece positioned within the housing inner space at least partially within the coil assembly axial bore and the magnet assembly axial bore, dimensioned so as to leave a gap between an inner surface of the magnet assembly and an outer surface of the central pole piece, wherein magnetic flux lines extend from the magnet assembly across the gap to the central pole piece.

5. The device recited in claim 4, wherein the central pole piece further has an axial bore therethrough in communication with the housing inner space.

6. The device recited in claim 5, wherein the housing further comprises a substantially annular support post extending upwardly from the bottom face into the inner space, the central pole piece positioned atop the support post and having an axial hole therethrough in communication with the central pole piece axial bore.

7. The device recited in claim 4, wherein the housing further comprises a substantially annular support post extending upwardly from the bottom face into the inner space, the central pole piece positioned atop the support post.

8. The device recited in claim 4, wherein the optical element is supportable adjacent a top end of the coil assembly and above the central pole piece.

9. The device recited in claim 1, further comprising a holder for joining the optical element to the coil assembly, the holder having an axial bore therethrough in communication with the coil assembly bore, the optical element positionable in communication with the holder axial bore.

10. A device for moving an optical element along an axis comprising:
    a housing having an inner space extending from a top face through to a bottom face;
    a magnet assembly mounted within the housing and having an axial bore therethrough communicating with the housing inner space;
    an electrically conductive coil assembly having an axial bore therethrough communicating and substantially concentric with the magnet assembly bore, the coil assembly mounted at least partially within the magnet assembly bore for limited axial movement within the housing, the coil assembly placeable in electrical communication with a power source, the coil assembly further having means for supporting an optical element for movement with the coil assembly; and
    a sensor supported and adapted for sensing an axial position of the coil assembly and placeable in signal communication with means for effecting the delivery of current from the power source to the coil assembly based upon the sensed axial position;
    wherein the coil assembly comprises a substantially cylindrical bobbin, a coil of wire extending circumferentially about the bobbin, and a conductive member having a first end connected adjacent a first end of the coil of wire and connectable adjacent a second end to a power source.

11. The device recited in claim 10, wherein the coil of wire comprises a top and a bottom coil of wire in axial spaced relation from each other on the bobbin, the top and the bottom wire coils connectable to a source of electricity so that electrical current flows in opposite directions therein.

12. The device recited in claim 10, wherein the coil of wire comprises a top and a bottom coil of wire in axial spaced relation from each other on the bobbin, a first end of the top coil of wire adjacent a top of the top coil of wire and a first end of the bottom coil of wire adjacent a bottom end of the bottom coil of wire, wherein electrical current introduced to the top and the bottom coils of wire flows in opposite directions therein.

13. The device recited in claim 1, wherein the housing comprises an outer housing, and further comprising an inner housing positionable at least partially within the outer housing inner space, the inner housing having an inner space for at least partially containing the magnet assembly and the coil assembly.

14. The device recited in claim 1, wherein the suspension system comprises a top and a bottom suspension member connecting, respectively, a top and a bottom of the housing to top and bottom ends of the coil assembly.

15. The device recited in claim 14, wherein each of the top and the bottom suspension members comprises a flexible disk having a plurality of annular corrugations therein.

16. The device recited in claim 14, wherein each of the top and the bottom suspension members comprises a flexible disk having a substantially dome-shaped central portion between an inner and an outer edge thereof.

17. The device recited in claim 1, wherein the sensor comprises:
a light sensor affixed on a first side of the coil assembly adjacent one of a top and a bottom end thereof; and
a light source affixed on a second side of the coil assembly adjacent the one of the top and the bottom end thereof opposed to the first side;
wherein axial movement of the coil assembly alters an amount of light from the light source reaching the light sensor, thereby providing an indication of coil assembly axial movement.

18. The device recited in claim 1, wherein the housing comprises a nonmagnetic material.

19. The device recited in claim 1, further comprising a magnetic sleeve positioned about at least a portion of the housing, for providing magnetic shielding.

20. A device for moving an optical element along an axis comprising:
a housing having an inner space extending from a top face through to a bottom face;
a magnet assembly mounted within the housing and having an axial bore therethrough communicating with the housing inner space;
an electrically conductive coil assembly having an axial bore therethrough communicating and substantially concentric with the magnet assembly bore, the coil assembly mounted at least partially within the magnet assembly bore for limited axial movement within the housing, the coil assembly placeable in electrical communication with a power source, the coil assembly further having means for supporting a focusing optical element affixed at least partially within the coil assembly bore;
a suspension system bridging the coil assembly and the housing, effective to maintain the coil assembly substantially centered within the magnet assembly bore, permitting the coil assembly to move axially but substantially preventing radial and rotational movement, the coil assembly biased by the suspension system to a substantially central resting position axially; and
a sensor affixed within the housing inner space adapted for sensing an axial position of the coil assembly and placeable in signal communication with means for effecting the delivery of current from the power source to the coil assembly based upon the sensed axial position.

21. The device recited in claim 20, further comprising a magnetic central pole piece positioned within the housing inner space at least partially within the coil assembly axial bore and the magnet assembly axial bore, dimensioned so as to leave a gap between an inner surface of the magnet assembly and an outer surface of the central pole piece, the central pole piece further having an axial bore therethrough in communication with the housing inner space, wherein magnetic flux lines extend from the magnet assembly across the gap to the central pole piece.

22. A method for moving an optical element along an axis comprising:
applying an electrical current to an electrically conductive coil assembly having an axial bore therethrough that communicates with and is substantially concentric with an axial bore of a magnet assembly, the coil assembly mounted at least partially within the magnet assembly bore for limited axial movement relative thereto, the coil assembly further having a focusing optical element supported least partially within the coil assembly bore;
sensing an axial position of the coil assembly; and
effecting a magnitude of a delivery of current to the coil assembly based upon the sensed axial position;
wherein the coil assembly comprises a substantially cylindrical bobbin, a coil of wire extending circumferentially about the bobbin, and a conductive member having a first end connected adjacent a first end of the coil of wire and connectable adjacent a second end to a power source.

23. The method recited in claim 22, wherein the coil of wire comprises a top and a bottom coil of wire in axial spaced relation from each other on the bobbin, and wherein the electricity applying comprises connecting the top and the bottom wire coils to a source of electricity so that electrical current flows in opposite directions therein.

24. A method for moving an optical element along an axis comprising:
applying an electrical current to an electrically conductive coil assembly having an axial bore therethrough that communicates with and is substantially concentric with an axial bore of a magnet assembly, the coil assembly mounted at least partially within the magnet assembly bore for limited axial movement relative thereto, the coil assembly further having a focusing optical element supported least partially within the coil assembly bore;
sensing an axial position of the coil assembly;
effecting a magnitude of a delivery of current to the coil assembly based upon the sensed axial position; and
maintaining the coil assembly substantially centered within the magnet assembly bore, thereby permitting the coil assembly to move axially but substantially preventing radial and rotational movement, the coil assembly biased to a substantially central resting position axially.

25. A method for moving an optical element along an axis comprising:
applying an electrical current to an electrically conductive coil assembly having an axial bore therethrough that communicates with and is substantially concentric with an axial bore of a magnet assembly, the coil assembly mounted at least partially within the magnet assembly bore for limited axial movement relative thereto, the coil assembly further having a focusing optical element supported least partially within the coil assembly bore;
sensing an axial position of the coil assembly; and
effecting a magnitude of a delivery of current to the coil assembly based upon the sensed axial position;

wherein the sensing comprises directing a light from a second side of the coil assembly to a light sensor on a first side of the coil assembly opposed to the second side, the light sensor adjacent one of a top and a bottom end of the coil assembly, wherein axial movement of the coil assembly alters an amount of light reaching the light sensor, thereby providing an indication of coil assembly axial movement.

* * * * *